April 14, 1931.   F. DUSTAN ET AL   1,800,444
STRONGBACK
Original Filed Feb. 9, 1929   3 Sheets-Sheet 1
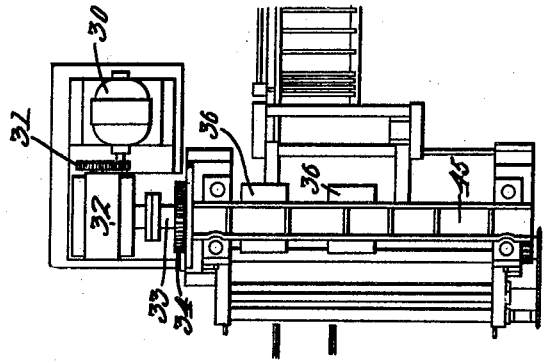
Fig. 2.
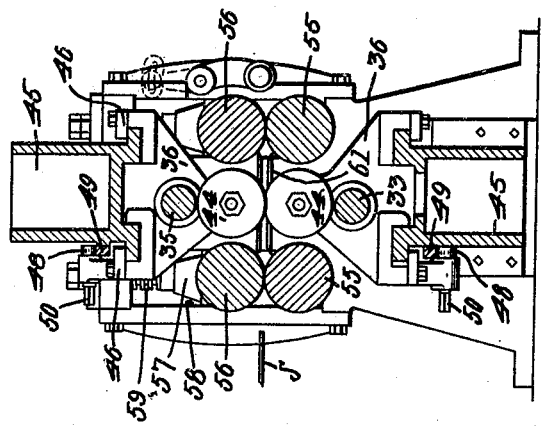
Fig. 3.
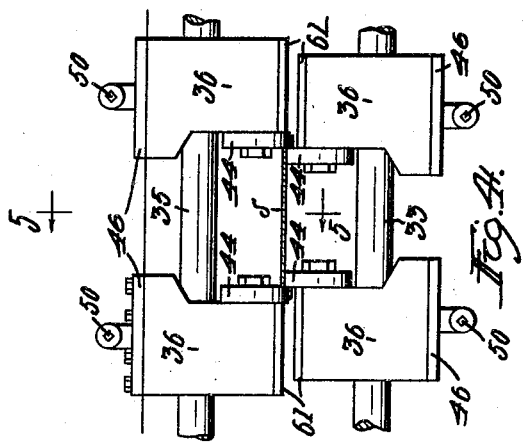
Fig. 4.
Inventors
Frank Dustan
Harry W. Cross
By Attorneys
Southgate Fay & Hawley

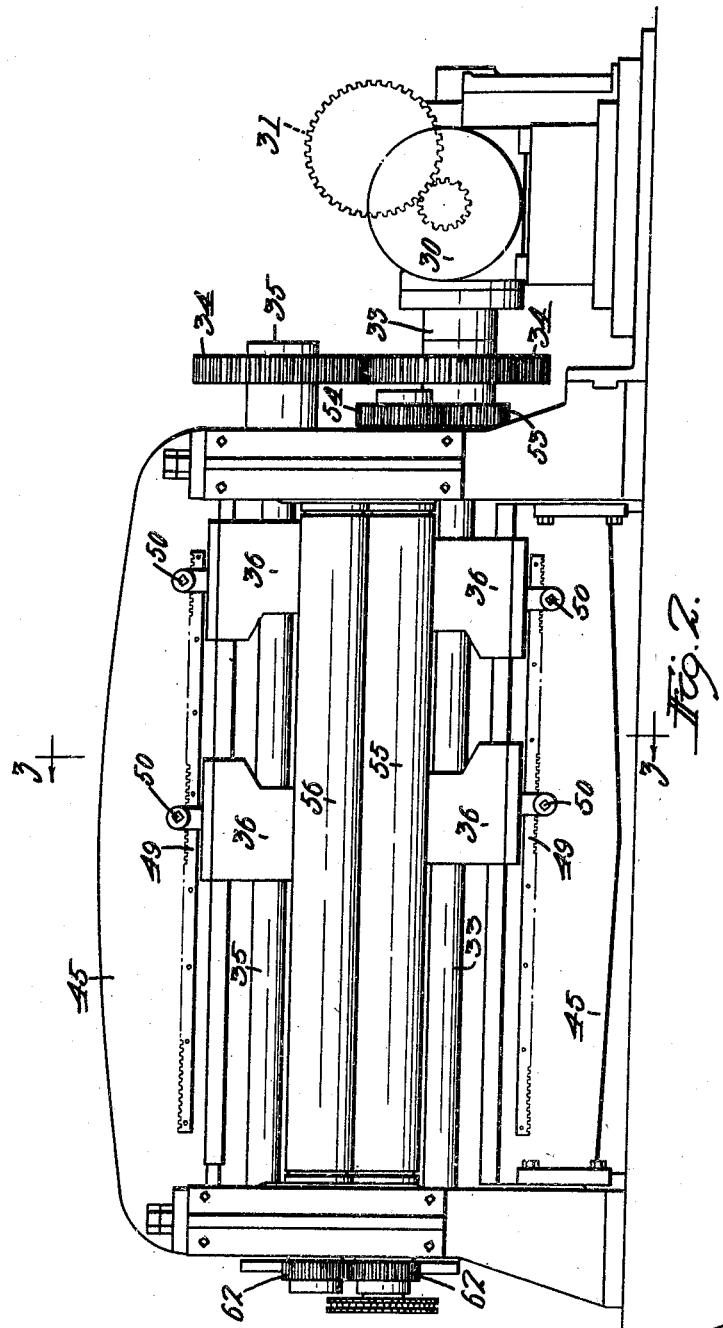

April 14, 1931.  F. DUSTAN ET AL  1,800,444
STRONGBACK
Original Filed Feb. 9, 1929   3 Sheets-Sheet 3
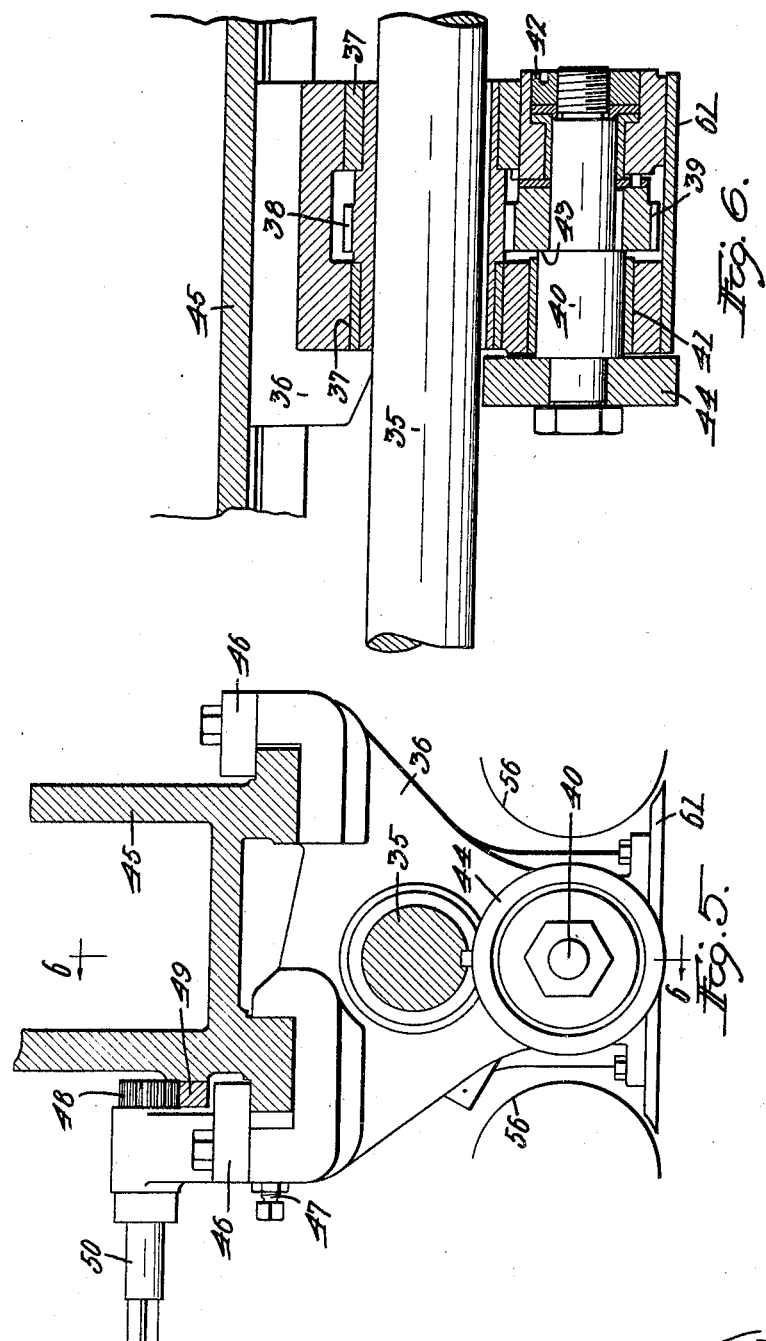

Patented Apr. 14, 1931

1,800,444

UNITED STATES PATENT OFFICE

FRANK DUSTAN, OF WILKINSBURG, PENNSYLVANIA, AND HARRY W. CROSS, OF FITCHBURG, MASSACHUSETTS, ASSIGNORS TO MANNING, MAXWELL & MOORE, INC., OF NEW YORK, N. Y., A CORPORATION OF NEW JERSEY

STRONG BACK

Original application filed February 9, 1929, Serial No. 338,872. Divided and this application filed January 27, 1930. Serial No. 423,586.

This is a division of my application for a patent on a rotary sheet squaring machine, Serial No. 338,872, filed February 9, 1929.

This invention relates to a machine for squaring metal sheets such as steel sheets and packs and the like.

The principal objects of the invention are to provide a machine for cutting and trimming metal sheets or packs either longitudinally or transversely with means for mounting the trimming cutters, each independently of the others, in a perfectly rigid manner and still provide for adjustment and removal without disturbing the shafts which directly operate them; and to provide suitable roller supports on which the sheets are deposited on the level of the side shearing mechanism.

The invention also involves improvements in the details of construction in the various features of the machine.

Reference is to be had to the accompanying drawings in which

Fig. 1 is a plan of a machine constructed in accordance with this invention;

Fig. 2 is an elevation of the mechanism for feeding in the plates and cutting them, showing either the longitudinal or side cutters;

Fig. 3 is a sectional view on the line 3—3 of Fig. 2;

Fig. 4 is a view taken inside the feed rolls of the trimming mechanism;

Fig. 5 is a sectional view on enlarged scale on the line 5—5 of Fig. 4; and

Fig. 6 is a sectional view on the line 6—6 of Fig. 5 showing the way of supporting the side cutters.

In the drawings, we have shown this invention as embodied in a machine which receives the metal sheets at a certain level and feeds them along and trims the side edges by rotary cutters as they move.

At this end of the machine is located the mechanism for trimming the edges of the sheets or packs fed to it. For this purpose we mount a motor 30 on the base or frame of the machine and reduce the speed through a pair of gears 31 and worm reducing gearing 32 to the drive shaft 33, which extends across the machine at right angles to the line of feed of the work. This shaft 33 is provided with a gear 34 meshing with a similar gear 34 on an upper shaft 35 so as to cause these two shafts 33 and 35 to operate together. By reference to Fig. 6 it will be seen that each of these shafts is provided with a block 36 having bearings 37 for a sleeve provided with a spur gear 38 which meshes with a spur gear 39 on a parallel shaft 40. This shaft is carried in the block 36 provided with bearings 41 and held in proper position in this casing by a nut 42 on the end and a shoulder 43 on the shaft, preventing endwise motion. At the end the shaft is provided with a rotary cutter 44 held on it by a nut or the like and coming up against a shoulder on the shaft 40 so as to be spaced from the block 36 slightly.

Two of the blocks 36 are located adjacent to the upper shaft 35 and two of them adjacent to the lower shaft 33 and from each of these blocks projects on the inner side a cutter 44. Thus there is a separate mounting for each individual cutter. The cutters are mounted on individual shafts and can be adjusted or replaced individually without taking out the shafts 33 or 35, because they are not mounted on these shafts as has been customary.

These cutters are arranged in pairs and are also arranged to cut by the shear method through the pack or sheet which will be supported on the cylindrical surfaces of the lower cutters. The scrap will pass down below the upper cutters. It will be understood of course that Figs. 5 and 6 show one of the upper blocks 36 and would represent the lower block if turned exactly the other side up.

The blocks 36 are mounted on two strong backs 45 on the frame of the machine which have horizontal ways for that purpose so that they are capable of being moved along the same and being held by gibs 46 which are screwed to the blocks 36. The blocks are clamped in position by screws 47. When loosened, they can be moved along the strong back by pinions 48 meshing with a stationary rack 49 and each operated by a shaft 50 having a squared end for the application of a wrench. This constitutes a strong rigid support for each cutter by itself and for the entire series of cutters.

The shaft 33 is also provided with a gear 53 which meshes with two side gears 54 mounted on the shafts of a pair of feed rolls 55. These constitute the lower feed rolls of the two pairs, the feeding-in and feeding-out rolls. The upper feed rolls 56 are mounted in bearing blocks 57 which are capable of sliding up and down in ways 58 and are normally forced down by strong springs 59 and the tension adjusted by nuts. These upper feed rolls therefore press on the plates or packs introduced between them. The lower rolls 55 are geared to the upper rolls 56 by gears 62 so that the upper rolls are positively operated. The side scrap passes between cover plate 61 located beyond the cutters 44. The inner faces of these cover plates act as guides for the side scrap.

On account of the mounting of the cutters on these separate shafts and running them from the main shafts 33 and 35, we avoid the difficulty encountered in removing the cutters for sharpening and repairs which has been experienced heretofore. Cutters for this purpose have been placed on the driving shafts and had to be screwed thereto and when they had to be removed they had to be slid the whole length of the shafts or nearly so and then the shafts had to be taken out of their bearings in order to get the cutters off. This is entirely avoided by the arrangement just described.

Although we have illustrated and described only one form of the invention, we are aware of the fact that modifications can be made therein by any person skilled in the art without departing from the scope of the invention as expressed in the claims.

Therefore, we do not wish to be limited in this respect but what we do claim is:—

1. In a metal sheet or pack cutting machine, the combination of a pair of positively driven shafts parallel with each other, two pairs of blocks, two pairs of parallel shafts carried by said blocks, a cutter carried by each of the last named shafts, said cutters being adapted to cooperate with each other in pairs to shear the sheets or packs as they move through the cutters, whereby said cutters can be removed and replaced without interfering with the first named shafts, and means on the first shafts for driving the second set of shafts.

2. In a metal sheet or pack cutting machine, the combination with the frame and an upper and lower strong back carried thereby, of a series of blocks each slidably carried by one of said strong backs, a shaft on each block carrying a cutter, the cutters carried by the upper and lower block cooperating to shear the sheets, a pair of driving shafts extending along said blocks and means for driving each cutter shaft from one of the driving shafts.

3. In a machine of the character described, the combination with a frame having ways along the top and bottom thereof, a set of blocks carried by the upper ways, a corresponding set of blocks carried by the lower ways, a pair of driving shafts supported by the frame, a series of cutter shafts each carried by one of said blocks, means on the driving shafts for rotating the cutter shafts, said blocks being supported by said ways rigidly in position and being adjustable along the driving shafts independently of each other.

In testimony whereof we have hereunto affixed our signatures.

FRANK DUSTAN.
HARRY W. CROSS.